(12) United States Patent
Makki et al.

(10) Patent No.: US 11,177,873 B2
(45) Date of Patent: Nov. 16, 2021

(54) ADAPTIVE RELAYING IN A NON-ORTHOGONAL MULTIPLE ACCESS (NOMA) COMMUNICATION SYSTEM

(71) Applicant: Telefonaktiebolaget LM Ericsson (publ), Stockholm (SE)

(72) Inventors: Behrooz Makki, Gothenburg (SE); Ali Behravan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 419 days.

(21) Appl. No.: 16/099,926

(22) PCT Filed: Aug. 8, 2018

(86) PCT No.: PCT/EP2018/071518
§ 371 (c)(1),
(2) Date: Nov. 8, 2018

(87) PCT Pub. No.: WO2020/030261
PCT Pub. Date: Feb. 13, 2020

(65) Prior Publication Data
US 2021/0075498 A1    Mar. 11, 2021

(51) Int. Cl.
*H04B 7/155* (2006.01)
(52) U.S. Cl.
CPC ..... *H04B 7/15592* (2013.01); *H04B 7/15521* (2013.01)
(58) Field of Classification Search
CPC .............. H04B 7/15592; H04B 7/15521
See application file for complete search history.

(56) References Cited

U.S. PATENT DOCUMENTS

| 2009/0221231 | A1* | 9/2009 | Weng | H04B 7/15585 |
| | | | | 455/15 |
| 2010/0027458 | A1* | 2/2010 | Wu | H04B 7/2606 |
| | | | | 370/315 |
| 2010/0110970 | A1* | 5/2010 | Hwang | H04B 7/15521 |
| | | | | 370/315 |
| 2012/0020279 | A1 | 1/2012 | Kim et al. | |
| 2020/0136733 | A1* | 4/2020 | Hassan Hussein | H04W 52/46 |

(Continued)

FOREIGN PATENT DOCUMENTS

EP    3 297 306 A1    3/2018

OTHER PUBLICATIONS

3GPP TR 36.866, V12.0.1, (Mar. 2014), 3rd Generation Partnership Project; Technical Specification Group Radio Access Network; Study on Network-Assisted Interference Cancellation and Suppression (NAIC) for LTE (Release 12), Mar. 2014, (64 pages).

(Continued)

*Primary Examiner* — Hassan Kizou
*Assistant Examiner* — Hector Reyes
(74) *Attorney, Agent, or Firm* — Rothwell, Figg, Ernst & Manbeck, P.C.

(57) ABSTRACT

A relay-based data transmission approach to improve the reliability and/or the energy efficiency of uplink NOMA. A relay node (RN) is employed to improve the performance of both weak and strong UEs. In some embodiments, superposition coding and NOMA-based transmission are applied at the RN and the UEs, respectively, to improve the achievable rates of the UEs.

16 Claims, 13 Drawing Sheets

(56) References Cited

U.S. PATENT DOCUMENTS

2020/0295891 A1* 9/2020 Koh .................. H04B 7/06

OTHER PUBLICATIONS

3GPP TR 36.859, V13.0.0, (Dec. 2015), 3rd Generation Partnership Project; Technical Specification Group Radio Access Network; Study on Downlink Multiuser Superposition Transmission (MUST) for LTE (Release 13), Dec. 2015, (48 pages).
3GPP TSG RAN WG1 Meeting #86, R1-166056; Göteborg, Sweden; Aug. 22-26, 2016; MCC Support, "Final Report of 3GPP TSG RAN WG1 #85 v1.0.0", (170 pages).
Xu, Peng et al., "NOMA: An Information Theoretic Perspective", IEEE, arXiv:1504.07751v2 [cs.IT], May 12, 2015, (6 pages).
International Search Report and Written Opinion issued in International Application No. PCT/EP2018/071518, dated May 17, 2019 (15 pages).
Chen, Y. et al., "Wireless Diversity through Network Coding", Wireless Communications and Networking Conference, IEEE, Las Vegas, NV, Apr. 3-6, 2006 (6 pages).
Chattha, J. et al., "Relay-Aided Non-orthogonal Multiple Access with Noisy Network Coding", IEEE International Conference on Communications, May 21, 2017 (6 pages).

* cited by examiner

ADAPTIVE RELAYING IN A NON-ORTHOGONAL MULTIPLE ACCESS (NOMA) COMMUNICATION SYSTEM

CROSS REFERENCE TO RELATED APPLICATION(S)

This application is a 35 U.S.C. § 371 National Stage of International Patent Application No. PCT/EP2018/071518, filed Aug. 8, 2018, designating the United States.

TECHNICAL FIELD

Disclosed are embodiments related to a non-orthogonal multiple access (NOMA) communication system.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with a base station or other access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same time resource and frequency resource as well as, if applicable, the same code resource and beam resource. Particularly, 3GPP has considered NOMA in different applications. For instance, NOMA has been introduced as an extension of the network-assisted interference cancellation and suppression (NAICS) for inter-cell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

There are situations where using NOMA not only outperforms OMA in terms of sum rate, but also is more optimal in achieving the maximum capacity region. The performance gain of NOMA, however, is at the cost of low achievable rates for "weak" UEs (i.e., UEs having a poor channel condition with the access point, such as, for example, a UE located at or near a cell-edge), particularly if the direct link between the weak UE and the network node (NN) experiences poor channel condition. This is especially because the relative performance gain of NOMA, compared to OMA, increases as the difference between the channel quality of the paired UEs increases. In such cases, the NN may experience a poor error probability for the data transmission of the weak UE.

This disclosure describes a relay-based data transmission approach to improve the reliability and the energy efficiency of uplink NOMA. A relay node (RN) is employed to improve the performance of both weak and strong UEs. In some embodiments, superposition coding and NOMA-based transmission are applied at the RN and the UEs, respectively, to improve the achievable rates of the UEs. Also, in some embodiments, adaptive transmission power allocation may be used at the UEs and/or the RN as well as adaptive decoding at the RN and the NN to improve the achievable rates/network reliability. While this disclosure describes the simplest case with two UEs and a single RN, the principles can be adapted to cases with arbitrary number of UEs and RNs as well.

Accordingly, in one aspect there is provided a method for receiving messages transmitted by a first user equipment (UE), where the method is performed by a network node (NN). The method includes the NN receiving, during a first time slot, a first signal comprising a first message, $X_1(t)$, transmitted by the first UE. The method also includes the NN receiving, during a second time slot that is subsequent to the first time slot, a combined signal that comprises: i) a second signal transmitted by a relay node, RN 202, the second signal comprising the first message $X_1(t)$ transmitted by the first UE during the first time slot and a second message $X_2(t)$ transmitted by a second UE during the first time slot and ii) a third signal transmitted by the first UE during the second time slot, wherein the third signal comprises a third message $X_1(t+1)$. The method also includes the NN decoding the first message. The method also includes the NN, after decoding the first message, producing a modified combined signal, wherein producing the modified combined signal comprises removing the decoded first message from the combined signal. And the method further includes the NN, after producing the modified combined signal, using the modified combined signal to decode the third message.

In another aspect there is provided a NN for receiving messages, where the NN is adapted to receive, during a first time slot, a first signal comprising a first message, $X_1(t)$, transmitted by a first UE and is further adapted to receive, during a second time slot that is subsequent to the first time slot, a combined signal that comprises: i) a second signal transmitted by a relay node (RN), the second signal comprising the first message $X_1(t)$ transmitted by the first UE during the first time slot and a second message $X_2(t)$ transmitted by a second UE during the first time slot and ii) a third signal transmitted by the first UE during the second time slot, wherein the third signal comprises a third message $X_1(t+1)$. The NN is also adapted to decode the first message. The NN is further adapted to, after decoding the first message, produce a modified combined signal, wherein producing the modified combined signal comprises removing the decoded first message from the combined signal. The NN is also adapted to, after producing the modified combined signal, use the modified combined signal to decode the third message $X_1(t+1)$ or the second message $X_2(t)$.

In some embodiment the NN includes a receiving unit, a decoding unit, and a modifying unit. The receiving unit is operable to receive, during a first time slot, a first signal comprising a first message, $X_1(t)$, transmitted by a first UE, and is also operable to receive, during a second time slot that is subsequent to the first time slot, a combined signal that comprises: i) a second signal transmitted by a relay node (RN), the second signal comprising the first message $X_1(t)$ transmitted by the first UE during the first time slot and a second message $X_2(t)$ transmitted by a second UE (101, 102) during the first time slot and ii) a third signal transmitted by the first UE during the second time slot, wherein the third signal comprises a third message $X_1(t+1)$. The decoding unit is operable to decode the first message. The modifying unit is operable to produce a modified combined signal by, at the least, removing the decoded first message from the combined signal. And the decoding unit is further operable to use the modified combined signal to decode the third message $X_1(t+1)$ or the second message $X_2(t)$.

In another aspect there is provided a method for relaying messages to a network node (NN), where the method is performed by a relay node (RN). The method includes the RN receiving a combined signal, the combined signal comprising a first message transmitted by a first user equipment, UE 101, in a first time slot, and a second message transmitted in the first time slot by a second UE 102. The method also includes the RN using a successive interference cancellation (SIC) decoder to decode the first message and then, remove the decoded first message from the combined signal and then decode the second message. The method also includes the RN using superposition coding generating a signal, $r(t+1)$, comprising the decoded first and second messages. And the method also includes the RN transmitting, in a second time slot that is subsequent to the first time slot, the generated signal $r(t+1)$ such that the signal can be received by the NN.

In another aspect there is provided an RN for relaying messages to an NN. The RN is adapted to receive a combined signal, the combined signal comprising a first message transmitted by a first user equipment, UE (101, 102), in a first time slot, and a second message transmitted in the first time slot by a second UE (101, 102), that is a different UE than the first UE. The RN is also adapted to use a successive interference cancellation, SIC, decoder to decode the first message and then, remove the decoded first message from the combined signal and then decode the second message. The RN is further adapted to use superposition coding generating a signal, $r(t+1)$, comprising the decoded first and second messages. The RN is also adapted to transmit, in a second time slot that is subsequent to the first time slot, the generated signal $r(t+1)$.

In some embodiments the RN includes a receiving unit that is operable to receive a combined signal, the combined signal comprising a first message transmitted by a first UE in a first time slot, and a second message transmitted in the first time slot by a second UE. The RN also includes a decoding unit for using a successive interference cancellation decoder to decode the first message and then, remove the decoded first message from the combined signal, thereby creating a residual signal, and then decoding the second message from the residual. The RN further includes a coding unit for using superposition coding to generate a signal, $r(t+1)$, comprising the decoded first and second messages. The RN also includes a transmitting unit for employing a transmitter to transmit, in a second time slot that is subsequent to the first time slot, the generated signal $r(t+1)$.

Each of the above embodiments improve the per-UE and the network throughput as well as the UEs energy efficiency. Also, using superposition coding at the RN gives the chance to avoid the link blockage and improve network reliability. This reduces the probability for requiring retransmissions and, as a result, improve the end-to-end packet transmission delay.

BRIEF DESCRIPTION OF THE DRAWINGS

The accompanying drawings, which are incorporated herein and form part of the specification, illustrate various embodiments.

DETAILED DESCRIPTION

Figure 1:
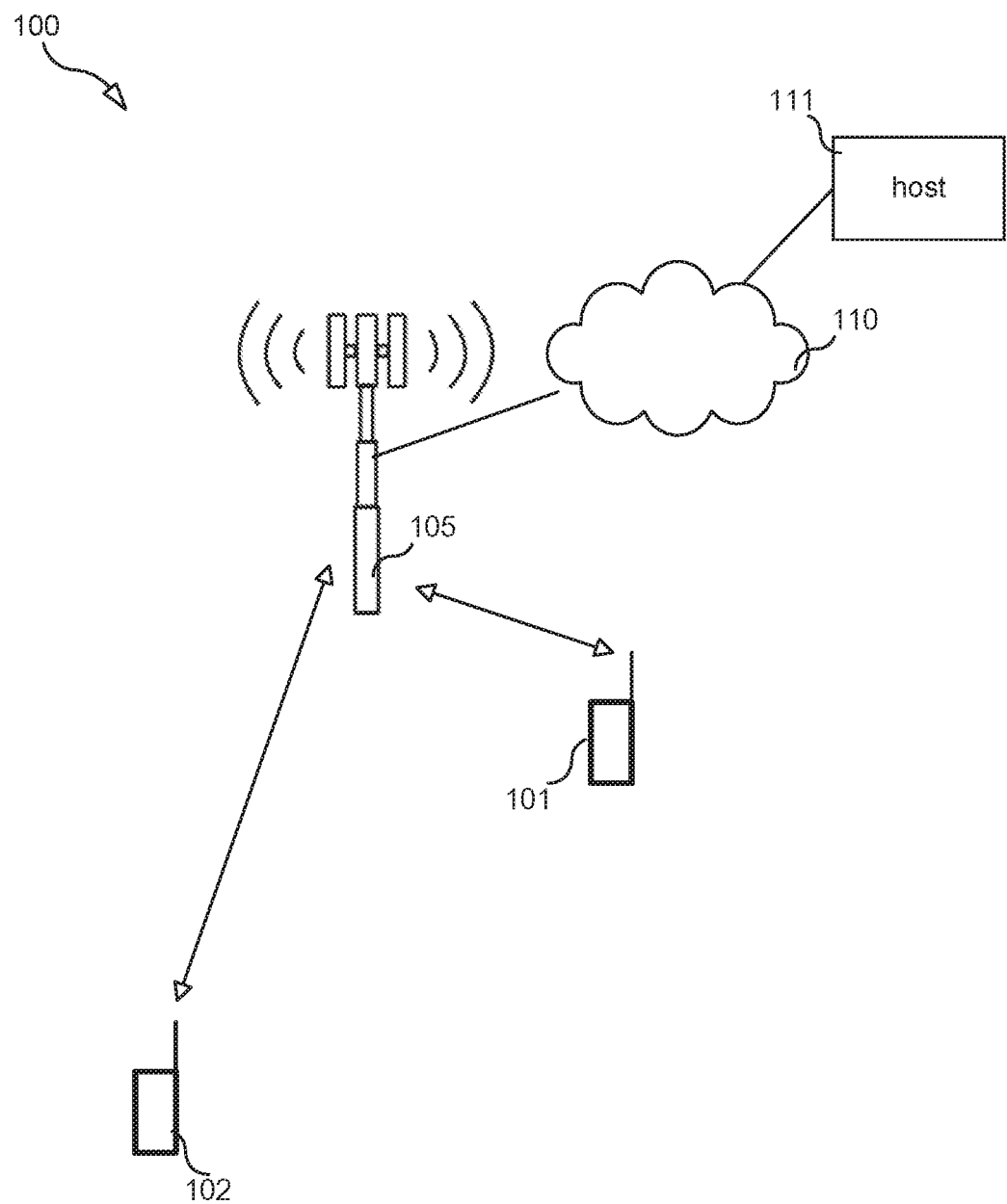
FIG. 1 illustrates a network node communicating simultaneously with a first UE and a second UE.

FIG. 1 illustrates a network 100 having a network node (NN) 105 (e.g., a system comprising a 4G or 5G base station or other access point) serving two UEs: UE 101 and UE 102. The two UEs have different channel (or "link") qualities. In this scenario, UE 102 is a "weak" UE (e.g., a cell-edge UE) and UE 101 is a "strong" UE (i.e., a UE experiencing a good channel condition with NN, such as, for example, a UE located at or near a cell center).

With respect to uplink OMA transmissions, the UE 101's and UE 102's signals are transmitted in orthogonal resources, for instance at the same time but in different frequency bands, and NN 105 decodes the two transmitted signals separately. With respect to downlink OMA transmissions, NN 105 transmits for UE 101 a first signal using for example a first frequency band and transmits for UE 102 a second signal using for example a second frequency band that does not overlap with the first frequency band.

With respect to uplink NOMA, on the other hand, the UEs share the same frequency (or "spectrum"), time resources, and code or spreading resources, if any, to send their messages simultaneously. That is, NN 105 receives a superimposed signal containing the message transmitted by UE 101 and the message transmitted by UE 102. In such a NOMA scenario, NN 105, using for example a successive interference cancellation (SIC) decoder, first decodes the message of UE 101 (the "strong" UE), considering the message of UE 102 as noise. Then, after successfully decoding UE 101's message, NN 105 subtracts UE 101's message from the received signal and decodes UE 102's signal with no interference from UE 101.

Considering the transmission setup of FIG. 1, the achievable rates of different UEs in the NOMA scheme are determined as:

$$\begin{cases} R_{1,NOMA} = \log_2\left(1 + \frac{P_1 g_1}{1 + P_2 g_2}\right) \text{ [bit/symbol]} & (i) \\ R_{2,NOMA} = \log_2(1 + P_2 g_2), \text{ [bit/symbol]} & (ii) \end{cases} \quad (1)$$

Here, $P_i$, i=1, 2, represents the transmission power of UE i. Also, $g_i = |h_i|^2$, i=1, 2, is the channel gain between the i-th UE and NN where $h_i$, i=1, 2, are the complex fading coefficients between the UEs and the NN. Moreover, we denote the maximum possible transmission power of the i-th UE by $P_{i,max}$, i=1, 2. Considering (1), it has been previously shown that the highest relative performance gain of NOMA, compared to OMA, is observed when a UE with a poor channel quality is paired with a UE experiencing high channel quality, i.e., when the difference between the channel values $g_i$, i=1, 2, increases. In such cases, although NOMA-based data transmission improves the UEs/sum throughput, the achievable rate of the cell-edge UE may be too low such that it needs many retransmissions.

The embodiments disclosed herein, however, not only improve the achievable rate/reliability for data transmission of the weak UE (e.g., cell-edge UE) but also leads to better energy efficiency/achievable rate for the strong UE (e.g., cell-center UE).

Figure 2:
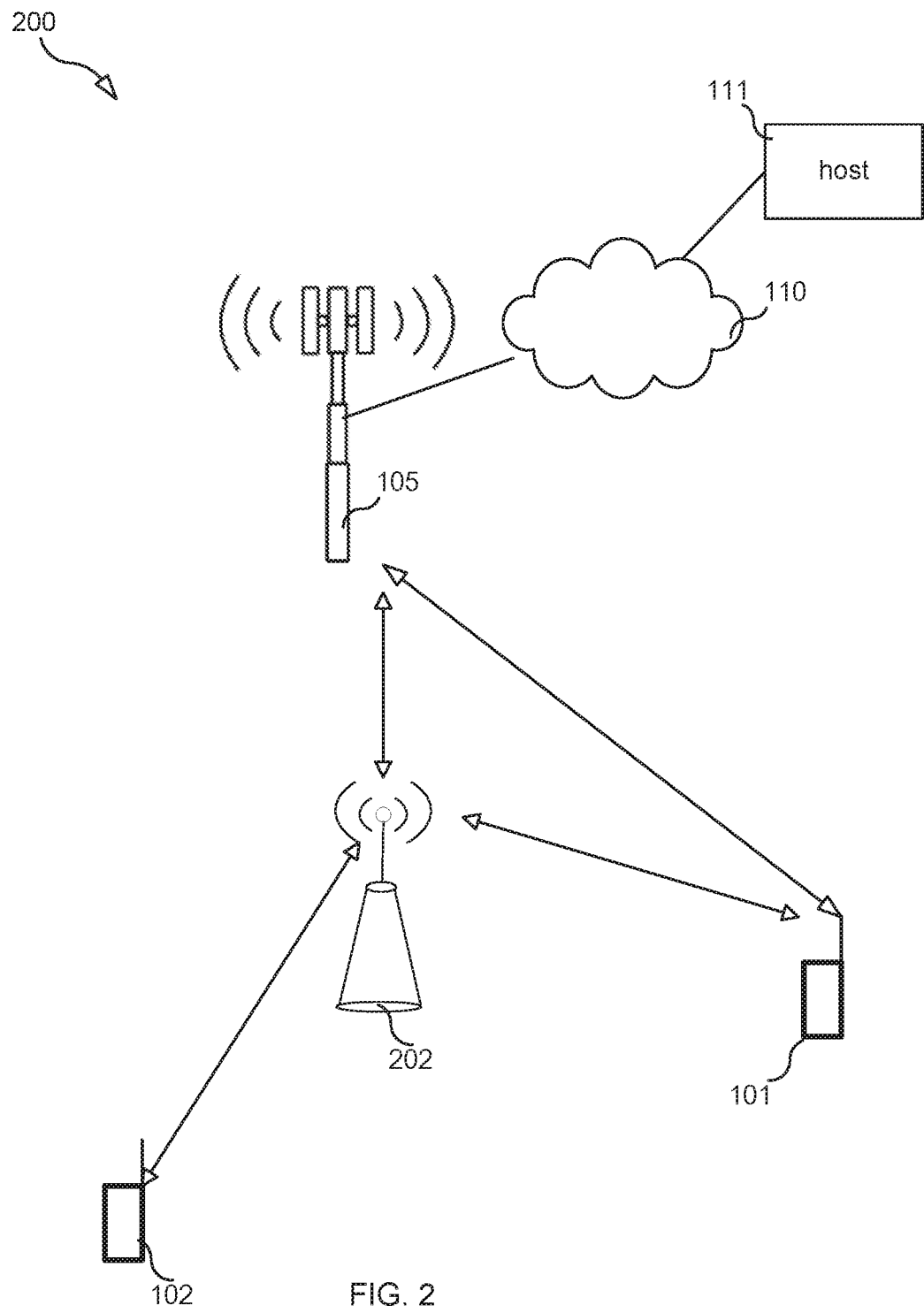
FIG. 2 illustrates a relay node relaying messages to a network node.

Referring now to FIG. 2, FIG. 2 illustrates a system 200 according to an embodiment. System 200 is a relay-based NOMA system that includes a relay node (RN) 202. For simplicity, we assume for this embodiment that there is no direct link between UE 102 and the NN 105, i.e., $h_2=0$, where $h_2$ denotes the channel between UE 102 and NN 105. However, in other embodiments $h_2 \neq 0$.

The UEs 101 and 102 adapt their transmission parameters, e.g., rate and transmission power, based on the channels condition/metric of interest as well as received scheduling instructions and send their corresponding messages in a NOMA-based fashion, i.e., on the same time/frequency resources. For example, in some embodiments the UEs transmit pilot signals that NN 105 and RN 202 can use to estimate the channel gains. For example, in the embodiment where there is no direct link between NN 105 and UE 102, NN 105 estimates the channel gain for the channel between NN 105 and UE 101, while RN 202 estimates the channel gain for the channel between RN 202 and UE 101 and also estimates the channel gain for the channel between RN 202 and UE 102. NN 105 and/or RN 202 also estimate the channel gain for the channel between NN 102 and RN 202. In some embodiments, NN 105 transmits to RN 202 information identifying the estimated channel gain for the channel between NN 105 and UE 101 (and NN 105 may also provide information identifying the estimated channel gain for the channel between NN 105 and RN 202) so that RN 202 will have information about all of the relevant channel gains and then solve (11) (described below) to determine an optimal transmission power for the first UE (i.e., the power at a which the first UE should transmit its message), determine an optimal transmission power for the second UE, and to determine the order in which RN 202 will decode the UE messages. Alternatively, RN 202 can transmit to NN 105 the channel gain information determined by RN 202 so that NN 105 can determine the optimal values for the power. In either case, the network node determining the optimal values for the power can inform the other network node of the determined optimal values as well as the UEs so that the other network node and the UEs will can determine the possible data rates.

Considering a particular time slot (slot t), in the time slot t, RN 202 receives a message transmitted by UE 101 (i.e., $X_1(t)$) and a message transmitted by UE 102 (i.e., $X_2(t)$), but NN 105 only receives the message transmitted by UE 101 because $h_2=0$. More specifically, the signals received by the RN 202 and the NN 105 in time slot t are given by:

$$Y_{RN}(t) = h_4\sqrt{P_1}X_1(t) + h_3\sqrt{P_2}X_2(t) + Z_{RN}(t), \quad (2)$$

and $$Y_{NN}(t) = h_1\sqrt{P_1}X_1(t) + Z_{NN}(t), \quad (3)$$

respectively, where h1 denotes the channel between UE 101 and NN 105, h3 denotes the channel between UE 102 and RN 202, and h4 denotes the channel between UE 101 and RN 202. $Z_{RN}(t)$ and $Z_{NN}(t)$ are the additive white Gaussian noises added at the RN and NN receivers, respectively.

In one embodiment, NN 105 buffers $Y_{NN}(t)$ with no message decoding.

And, in one embodiment, after receiving $Y_{RN}(t)$, the RN then uses a conventional SIC decoder to, depending on the quality of the channels between the UEs 101 and 102 and the RN 202, first decode one of the UE's signals (i.e., the stronger signal) and then, remove the decoded message from $Y_{RN}(t)$, and then decode the other signal (i.e., the weaker signal) interference-free. More specifically, as is known in the art, assuming that the quality of the channel between UE 101 and RN 202 is much better than the quality of the channel between UE 102 and RN 202, the RN first uses the combined signal (i.e., $Y_{RN}(t)$) to decode the message transmitted by UE 101 (i.e., $X_1(t)$) and then using the decoded message constructs a signal (e.g., determines $h_4\sqrt{P_1}X_1(t)$) the and then removes (i.e., cancels) the constructed signal from the combined signal so that $X_2(t)$ can then be decoded from the residual (e.g., $X_2(t)$ can be decoded from $h_3\sqrt{P_2}X_2(t) + Z_{RN}(t)$)

For example, depending on the channels conditions, the RN uses adaptive SIC-based receiver to decode $X_i(t)$, i=1, 2. Particularly, if $SNR_4 > SNR_3$, the RN first decodes and removes $X_1(t)$ and then decodes $X_2(t)$ interference-free, and on the other hand, with $SNR_4 < SNR_3$, first $X_2(t)$ is decoded and removed and then $X_1(t)$ is decoded with no interference from UE 102. Here, $SNR_4 = P_1 g_4$, and $SNR_3 = P_2 g_3$, with $g_i = |h_i|^2$, $\forall i$. The UEs may be informed about the message decoding schemes of the RN and the NN before data transmission, which affect their rate/power adaption.

Also, the RN may use superposition coding to forward both decoded messages $X_1(t)$ and $X_2(t)$ to the NN in time slot t+1. In this way, the signal transmitted by the RN in time slot t+1 is given by:

$$\Gamma(t+1) = \sqrt{S}(\alpha_1 X_1(t) + \alpha_2 X_2(t)), \quad (4)$$

where S is the RN total transmit power and $\alpha_i$, i=1, 2, with $\alpha_1^2 + \alpha_2^2 = 1$, are parameters determining the portion of the power allocated to the signals $X_i(t)$, i=1, 2.

Further, in time slot t+1, UE 101 sends a new message $X_1(t+1)$ which is received by the NN 105. In this way, the signal received by the NN in time slot t+1 is given by:

$$Y_{NN}(t+1) = h_5\sqrt{S}(\alpha_1 X_1(t) + \alpha_2 X_2(t)) + h_1\sqrt{\tilde{P}_1}X_1(t+1) + Z_{NN}(t+1), \quad (5)$$

where, $\tilde{P}_1$ denotes the transmission power of UE 101 when pairing with the RN in time slot t+1.

With no loss of generality, assume that:

$$g_1 P_1 + \frac{g_5 s \alpha_1^2}{1 + g_5 s \alpha_2^2 + g_1 \tilde{P}_1} > g_1 \tilde{P}_1 > g_5 s \alpha_2^2, \quad (6)$$

i.e., decoding $X_1(t)$, $X_2(t)$ and $X_1(t+1)$ and considering the two received signals (3) and (5), the NN 105 experiences the best channel quality for decoding $X_1(t)$ and the worst channel quality for decoding $X_2(t)$. Assuming (6), the NN first uses maximum ratio combining (MRC) and two received signals (3) and (5) to decode and remove $X_1(t)$. Then, $X_1(t+1)$ is decoded and removed treating the term $h_5\sqrt{s}\alpha_2 X_2(t)$ as noise. Finally, $X_2(t)$ is decoded interference-free. Note that, (6) is not a necessary assumption and, for every order of channel qualities, the NN adapts its decoding scheme to first decode and remove the signals with better received SNRs.

The achievable rates at the RN are given by:

$$\begin{cases} R_{1,RN} = I(P_1 g_4 \geq P_2 g_3)\log_2\left(1 + \frac{P_1 g_4}{1 + P_2 g_3}\right) + I(P_1 g_4 < P_2 g_3)\log_2(1 + P_1 g_4) & (i) \\ R_{2,RN} = I(P_1 g_4 \geq P_2 g_3)\log_2(1 + P_2 g_3) + I(P_1 g_4 < P_2 g_3)\log_2\left(1 + \frac{P_2 g_3}{1 + P_1 g_4}\right), & (ii) \end{cases} \quad (7)$$

with I(•) denoting the indicator function, i.e., $$I(x) = \begin{cases} 1 & \text{if } x = \text{true} \\ 0 & \text{otherwise} \end{cases}. \quad (8)$$

Also, the achievable rates at the NN are obtained by $$\begin{cases} R_{1,NN} = I(c_1 \text{ or } c_2)\log_2\left(1 + g_1 P_1 + \frac{g_5 s \alpha_1^2}{1 + g_5 s \alpha_2^2 + g_1 \tilde{P}_1}\right) + \\ \qquad I(c_3)\log_2\left(1 + g_1 P_1 + \frac{g_5 s \alpha_1^2}{1 + g_1 \tilde{P}_1}\right) + \\ \qquad I(c_4 \text{ or } c_5)\log_2(1 + g_1 P_1 + g_5 s \alpha_1^2) + \\ \qquad I(c_6)\log_2\left(1 + g_1 P_1 + \frac{g_5 s \alpha_1^2}{1 + g_5 s \alpha_2^2}\right), & (i) \\ \tilde{R}_{1,NN} = I(c_5 \text{ or } c_6)\log_2\left(1 + \frac{g_1 \tilde{P}_1}{1 + g_5 s \alpha_2^2 + g_5 s \alpha_1^2}\right) + \\ \qquad I(c_2 \text{ or } c_3)\log_2(1 + g_1 \tilde{P}_1) + \\ \qquad I(c_1)\log_2\left(1 + \frac{g_1 \tilde{P}_1}{1 + g_5 s \alpha_2^2}\right) + I(c_4)\log_2\left(1 + \frac{g_1 \tilde{P}_1}{1 + g_5 s \alpha_1^2}\right), & (ii) \\ R_{2,NN} = I(c_3 \text{ or } c_4)\log_2\left(1 + \frac{g_5 s \alpha_2^2}{1 + g_1 \tilde{P}_1 + g_5 s \alpha_1^2}\right) + \\ \qquad I(c_1 \text{ or } c_6)\log_2(1 + g_5 s \alpha_2^2) + \\ \qquad I(c_2)\log_2\left(1 + \frac{g_5 s \alpha_2^2}{1 + g_1 \tilde{P}_1}\right) + I(c_5)\log_2\left(1 + \frac{g_5 s \alpha_2^2}{1 + g_5 s \alpha_1^2}\right), & (iii) \end{cases} \quad (9)$$

with (10)

$$\begin{cases} c_1 = g_1 P_1 + \frac{g_5 s \alpha_1^2}{1 + g_5 s \alpha_2^2 + g_1 \tilde{P}_1} > g_1 \tilde{P}_1 > g_5 s \alpha_2^2, \\ c_2 = g_1 P_1 + \frac{g_5 s \alpha_1^2}{1 + g_5 s \alpha_2^2 + g_1 \tilde{P}_1} > g_5 s \alpha_2^2 > g_1 \tilde{P}_1, \\ c_3 = g_5 s \alpha_2^2 > g_1 P_1 + \frac{g_5 s \alpha_1^2}{1 + g_5 s \alpha_2^2 + g_1 \tilde{P}_1} > g_1 \tilde{P}_1, \\ c_4 = g_5 s \alpha_2^2 > g_1 \tilde{P}_1 > g_1 P_1 + \frac{g_5 s \alpha_1^2}{1 + g_5 s \alpha_2^2 + g_1 \tilde{P}_1}, \\ c_5 = g_1 \tilde{P}_1 > g_5 s \alpha_2^2 > g_1 P_1 + \frac{g_5 s \alpha_1^2}{1 + g_5 s \alpha_2^2 + g_1 \tilde{P}_1}, \\ c_6 = g_1 \tilde{P}_1 > g_1 P_1 + \frac{g_5 s \alpha_1^2}{1 + g_5 s \alpha_2^2 + g_1 \tilde{P}_1} > g_5 s \alpha_2^2. \end{cases}$$

In (9), $R_{1,NN}$ and $\tilde{R}_{1,NN}$ are the achievable rates for UE 101 in time slots t and t+1, respectively, while $R_{2,NN}$ represents the achievable rate for UE 102.

Figure 3:
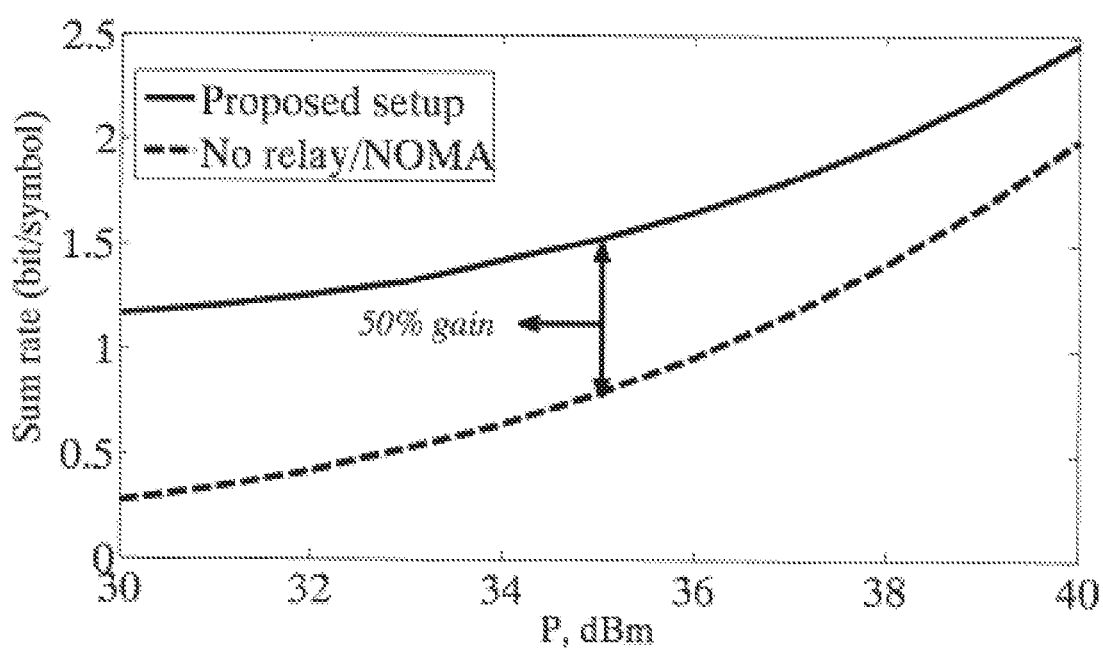
FIG. 3 is a graph illustrating an improvement realized by an embodiment.

Using (7) and (9), one can determine, e.g., the power allocation optimizing different performance metrics. For instance, considering the NN sum rate, the optimization problem can be expressed as $$\begin{cases} \max_{P_1, \tilde{P}_1, P_2, \alpha_1, \alpha_2} R_{1,NN} + \tilde{R}_{1,NN} + R_{2,NN} \\ \text{s.t. } \alpha_1^2 + \alpha_2^2 = 1, \\ P_1 \leq P_{1,max}, P_2 \leq P_{2,max}, \tilde{P}_1 \leq P_{1,max}, \\ R_{1,RN} \geq R_{1,NN}, \\ R_{2,RN} \geq R_{2,NN} \end{cases} \quad (11)$$

where the last two constraints guarantee that the RN can decode the UEs signals in time slot t successfully. As an example, FIG. 3 compares the sum rate in the cases with and without the proposed scheme. Here, the results are presented for an example case with $$g_1 = g_3 = g_4 = g_5 = 0.1, g_2 = 0,$$
$$P_1 = \tilde{P}_1 = P_2 = P, \alpha_1 = \alpha_2 = \frac{1}{\sqrt{2}}, \text{ and } S = 40$$

dBm in the cases using RN, otherwise S=0 if no RN is used. As seen in FIG. 3, even without parameter optimization, the implementation of the RN and the proposed data transmission scheme improve the sum throughput at P=35 dBm by 50%. Indeed, the relative performance gain will increase considerably if the transmission parameters are optimized in terms of (11).

In some embodiments, the RN and/or the NN provides to the UEs information (e.g., information indicating the message decoding schemes used by the RN and/or the NN, information about the channels qualities, and/or information indicating the maximum acceptable rate that the UE can use) and then the UEs adapt their transmission parameters/decoding schemes based on this information. For example, using Channel State Information (CSI), the RN and/or the NN first use (7) and (9) to find the appropriate message decoding scheme and their corresponding achievable rates. Then, using some feedback signals, this information (e.g., channel quality information, rate information, etc.) is shared with the UEs which adapt their transmission parameters correspondingly. Because NOMA-based schemes are typically of interest in stationary/slow-moving systems, the update of this information may be required after multiple packet transmissions and, as a result, the feedback overhead is negligible.

For simplicity it was assumed that there is no direct link between UE 102 and the NN, but this is not a requirement. In the case in which UE 102 has a direct link with the NN, in time slot t+1, the NN has two copies of the message sent by UE 102 (i.e., two copies of $X_2(t)$) and can perform MRC to decode $X_2(t)$, with the same procedure as for decoding $X_1(t)$.

Due to the CSI acquisition/synchronization overhead, NOMA is of particular interest in stationary/slow-moving UEs. In such cases, there is low diversity and the probability of requiring multiple retransmissions increases. As described above, however, UE 101 is paired with different nodes in different time slots. This creates virtual diversity and reduces the probability of requiring multiple retransmissions and, consequently, improves the expected end-to-end packet transmission delay for UE 101.

In time slot t UE 101 may use a transmission rate and/or transmission power that is different than the transmission rate and/or transmission power that UE 101 uses in time slot t+1. Different transmission rates and/or powers are considered for UE 101 because it is paired with different nodes, namely, UE 102 and RN, in time slots t and t+1 respectively. For example, in time slot t, UE 101 can be more aggressive (e.g., send data with lower power and/or higher rate) because the NN will decode $X_1(t)$ based on two copies of the signal. Thus, for given transmission rates, not only the proposed scheme improves the energy efficiency of UE 101, but also improves the performance of UE 102 because it is affected by less interference when connecting to the RN. In time slot t+1, on the other hand, UE 101 may be more conservative as the NN should decode $X_1(t+1)$ only based on the signal $Y_{NN}(t+1)$.

The UE 101 benefits from the proposed scheme because, 1) the presence of the RN and NOMA-based increases its achievable rate, 2) superposition coding, adaptive power allocation as well as adaptive decoding at the RN and the NN give the chance to improve the data transmission efficiency in the UE 102-NN link and 3) as explained, the proposed scheme may reduce the transmission of UE 101 which leads to less interference observed when decoding $X_2(t)$.

Embodiments described above focus on optimizing the network sum throughput. However, the embodiments can be applied to the cases with other performance metrics, e.g., satisfying the per-UEs rate constraints.

In an embodiment described above, at time slot t the NN buffers $X_1(t)$ with no message decoding. This reduces the decoding complexity of the NN. However, as an alternative, the NN may try decoding $X_1(t)$ in both time slots t and t+1.

Then, if $X_1(t)$ is correctly decoded in time slot t, it is removed from $Y_{NN}(t+1)$ and only $X_1(t+1)$ and $X_2(t)$ are decoded.

Figure 4:
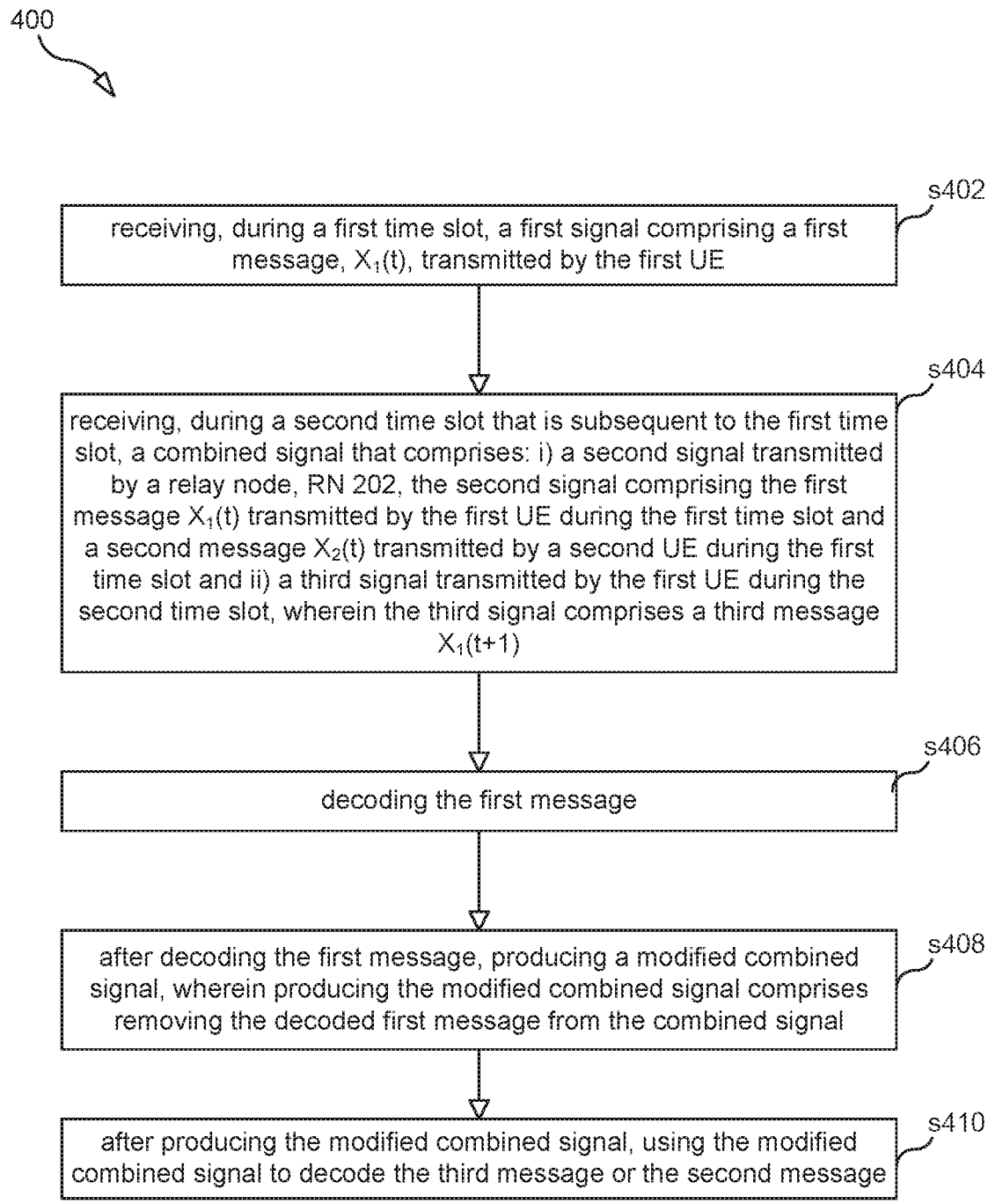
FIG. 4 is a flow chart illustrating a process according to one embodiment.

FIG. 4 is a flowchart illustrating a process 400 for receiving messages transmitted by UE 101, the method is performed by NN 105. Process 400 includes step s402 in which NN 105 receives, during a first time slot, a first signal comprising a first message, $X_1(t)$, transmitted by the first UE.

In step s404, NN 105 receives, during a second time slot that is subsequent to the first time slot, a combined signal that comprises: i) a second signal transmitted by a relay node, RN 202, the second signal comprising the first message $X_1(t)$ transmitted by the first UE during the first time slot and a second message $X_2(t)$ transmitted by a second UE during the first time slot and ii) a third signal transmitted by the first UE during the second time slot, wherein the third signal comprises a third message $X_1(t+1)$.

In step s406, NN 105 decodes the first message. In some embodiments, decoding the first message comprises using the received first signal and the received combined signal to decode the first message. In some embodiments, decoding the first message using the received first signal and the received combined signal comprises decoding the first message using maximum ratio combining, MRC, the received first signal and the received combined signal to decode the first message.

In step s408, NN 105, after decoding the first message, produces a modified combined signal, wherein producing the modified combined signal comprises removing the decoded first message from the combined signal.

And in steps s410, after producing the modified combined signal, NN 105 uses the modified combined signal to decode the third message $X_1(t+1)$ or the second message $X_2(t)$. In some scenarios, the third message $X_1(t+1)$ is decoded prior to decoding the first message $X_1(t)$, and in other scenarios the second message $X_2(t)$ is decoded prior to decoding the first message $X_1(t)$. In short, depending on the channels conditions, any order of the message decoding may be optimal.

In some embodiments, the method also includes NN 105, after decoding the third message, producing a further modified combined signal, wherein producing the further modified combined signal comprises removing the decoded third message $X_1(t+1)$ from the modified combined signal; and after producing the further modified combined signal, using the further modified combined signal to decode the second message $X_2(t)$.

In other embodiments, the method also includes NN 105, after decoding the second message, producing a further modified combined signal, wherein producing the further modified combined signal comprises removing the decoded second message $X_2(t)$ from the modified combined signal; and after producing the further modified combined signal, using the further modified combined signal to decode the third message $X_1(t+1)$.

In some embodiments, the first signal is a combined signal that comprises not only the first message $X_1(t)$ but also the second message $X_2(t)$, and the method further comprises using MRC, the first signal, and the received combined signal to decode the second message.

Figure 5:
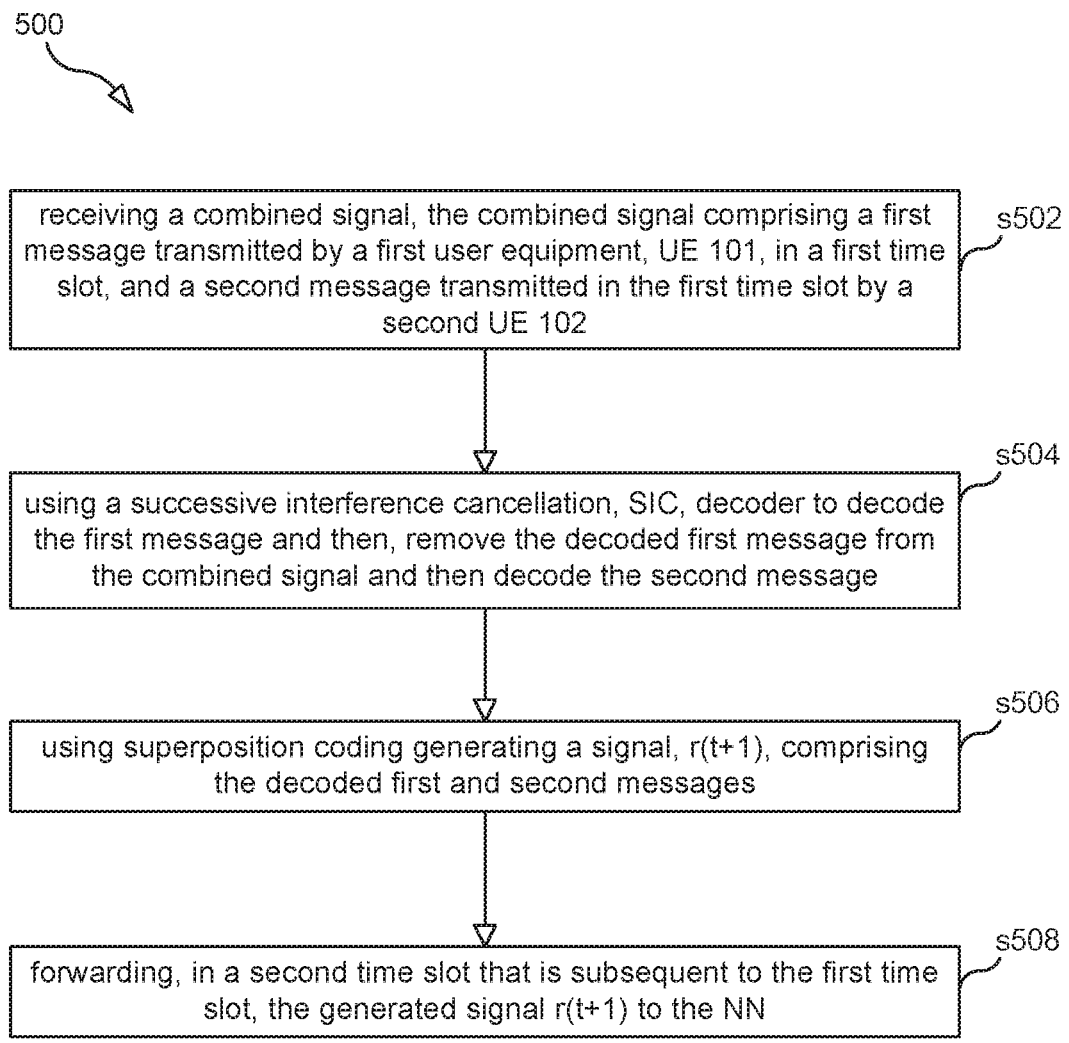
FIG. 5 is a flow chart illustrating a process according to one embodiment.

FIG. 5 is a flowchart illustrating a process 500 for relaying messages to NN 105, the method being performed by RN 202. Process 500 includes step s502 in which RN 202 receives a combined signal, the combined signal comprising a first message transmitted by a first user equipment, UE 101, in a first time slot, and a second message transmitted in the first time slot by a second UE 102.

In step s504, RN 202 uses a successive interference cancellation, SIC, decoder to decode the first message and then, remove the decoded first message from the combined signal and then decode the second message.

In step s506, RN 202 uses superposition coding generating a signal, r(t+1), comprising the decoded first and second messages.

An in step s508 RN 202 transmit, in a second time slot that is subsequent to the first time slot, the generated signal r(t+1) so that the signal can be received by NN 105.

In some embodiment, process 500 also includes, prior to receiving the combined signal, the RN performs the steps of: i) estimating a first channel gain for a channel between the RN and the first UE, ii) estimating a second channel gain for a channel between the RN and the second UE, and iii) using the estimated first and second channel gains to determine a first transmission power at which the first UE should transmit the first message and a second transmission power at which the second UE should transmit the second message. In such an embodiment the RN may also perform the following steps prior to receiving the combined signal: i) transmitting to the first UE information indicating the first transmission power and ii) transmitting to the second UE information indicating the second transmission power.

Figure 6:
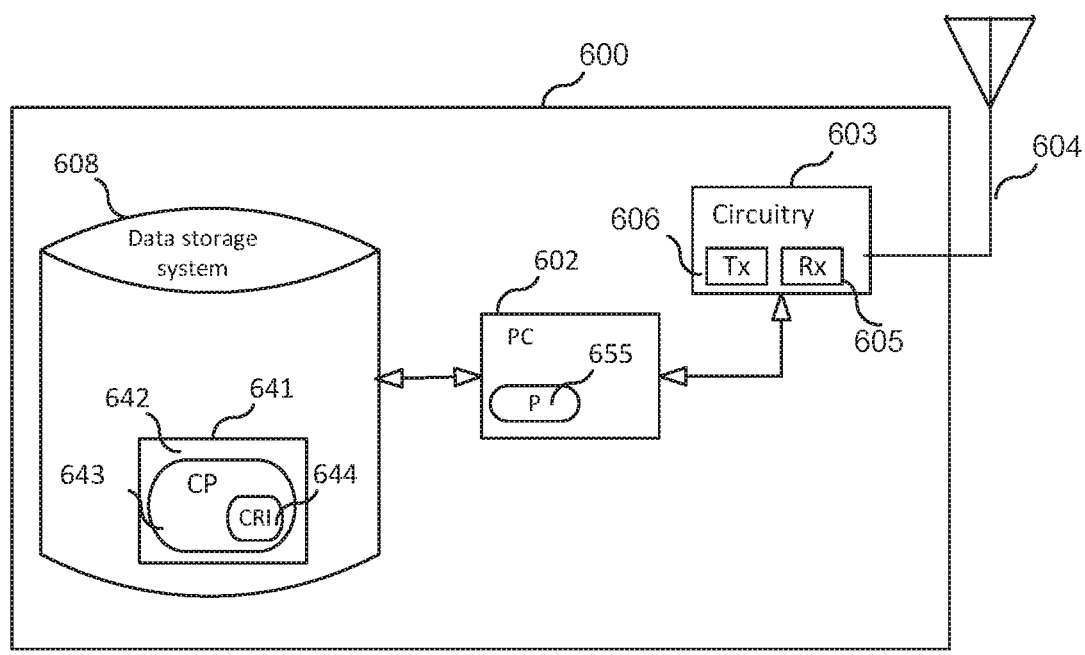
FIG. 6 is a block diagram of an apparatus according to one embodiment.

FIG. 6 is a block diagram of an apparatus 600, according to some embodiments for performing methods disclosed herein. That is, apparatus 600 can be used to implement either NN 105 or RN 202. As shown in FIG. 6, apparatus 600 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located or distributed in different locations; circuitry 603 (e.g., radio transceiver circuitry comprising an Rx 605 and a Tx 606) coupled to an antenna system 604 for wireless communication); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes apparatus 600 to perform steps described herein (e.g., steps described herein with reference to the flow charts). In other embodiments, apparatus 600 may be configured to perform steps described herein without the need for code. That is, for example, PC 602 may consist merely of one or more ASICs. Hence, the features of the embodiments described herein may be implemented in hardware and/or software.

Figure 7A:
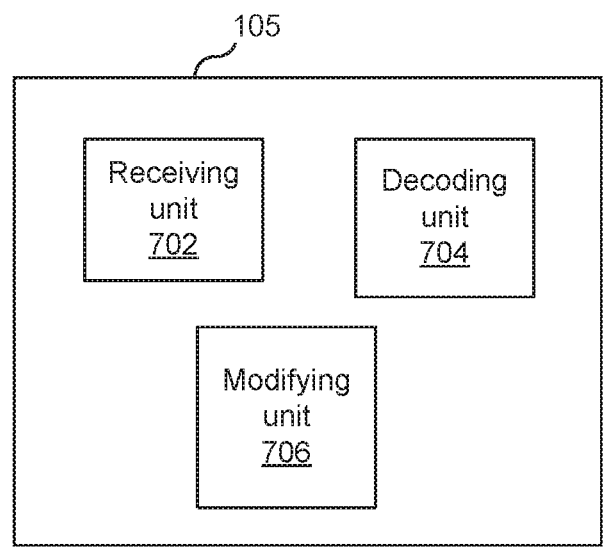
FIG. 7A is a diagram showing functional units of a network node according to an embodiment.

FIG. 7A is a diagram showing functional units of network node 105 according to an embodiment. In the embodiment shown, network node 105 includes: a receiving unit 702, a decoding unit 704 and modifying unit 706. The receiving unit is operable to receive, during a first time slot, a first signal comprising a first message, $X_1(t)$, transmitted by a first UE (e.g., UE 101). The receiving unit 702 is also operable to receive, during a second time slot that is subsequent to the first time slot, a combined signal that comprises: i) a second signal transmitted by RN 202, the second signal comprising the first message $X_1(t)$ transmitted by the first UE during the first time slot and a second message $X_2(t)$ transmitted by a second UE (e.g., UE 102) during the first time slot and ii) a third signal transmitted by the first UE during the second time slot, wherein the third signal comprises a third message $X_1(t+1)$. The decoding unit 704 is operable to decode the first message. The modifying unit 706 is operable to produce a modified combined signal by, at the least, removing the decoded first message from the combined signal. The decoding unit 704 is further operable to use the modified combined signal to decode the third message $X_1(t+1)$ or the second message $X_2(t)$.

Figure 7B:
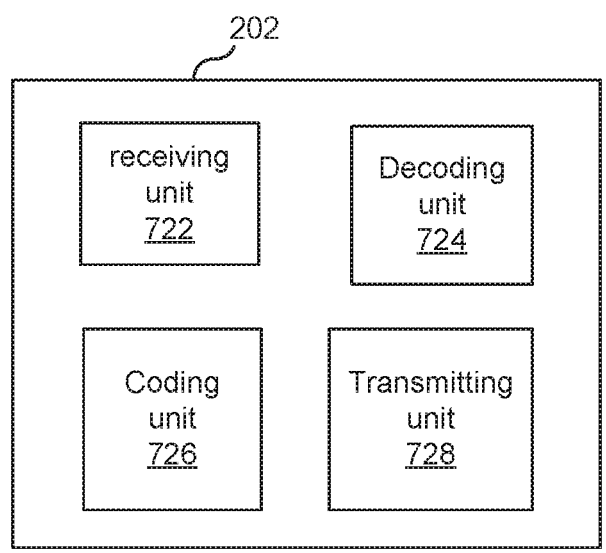
FIG. 7B is a diagram showing functional units of a relay node according to an embodiment.

FIG. 7B is a diagram showing functional units of RN 202 according to an embodiment. In the embodiment shown, RN 202 includes: a receiving unit 722 that is operable to receive a combined signal, the combined signal comprising a first message transmitted by a first user equipment (e.g., UE 101 or UE 102), in a first time slot, and a second message transmitted in the first time slot by a second UE (e.g., UE 101 if the first UE is UE 102 or UE 102 if the first UE is UE 101). A decoding unit 724 for using a successive interference cancellation (SIC) decoder to decode the first message and then, remove the decoded first message from the combined signal, thereby creating a residual signal, and then decoding the second message from the residual. A coding unit 726 for using superposition coding to generate a signal (r(t+1)) comprising the decoded first and second messages. And a transmitting unit 728 for employing a transmitter (e.g., Tx 606) to transmit, in a second time slot that is subsequent to the first time slot, the generated signal r(t+1) so that the generated signal can be received by NN 105.

Figure 8:
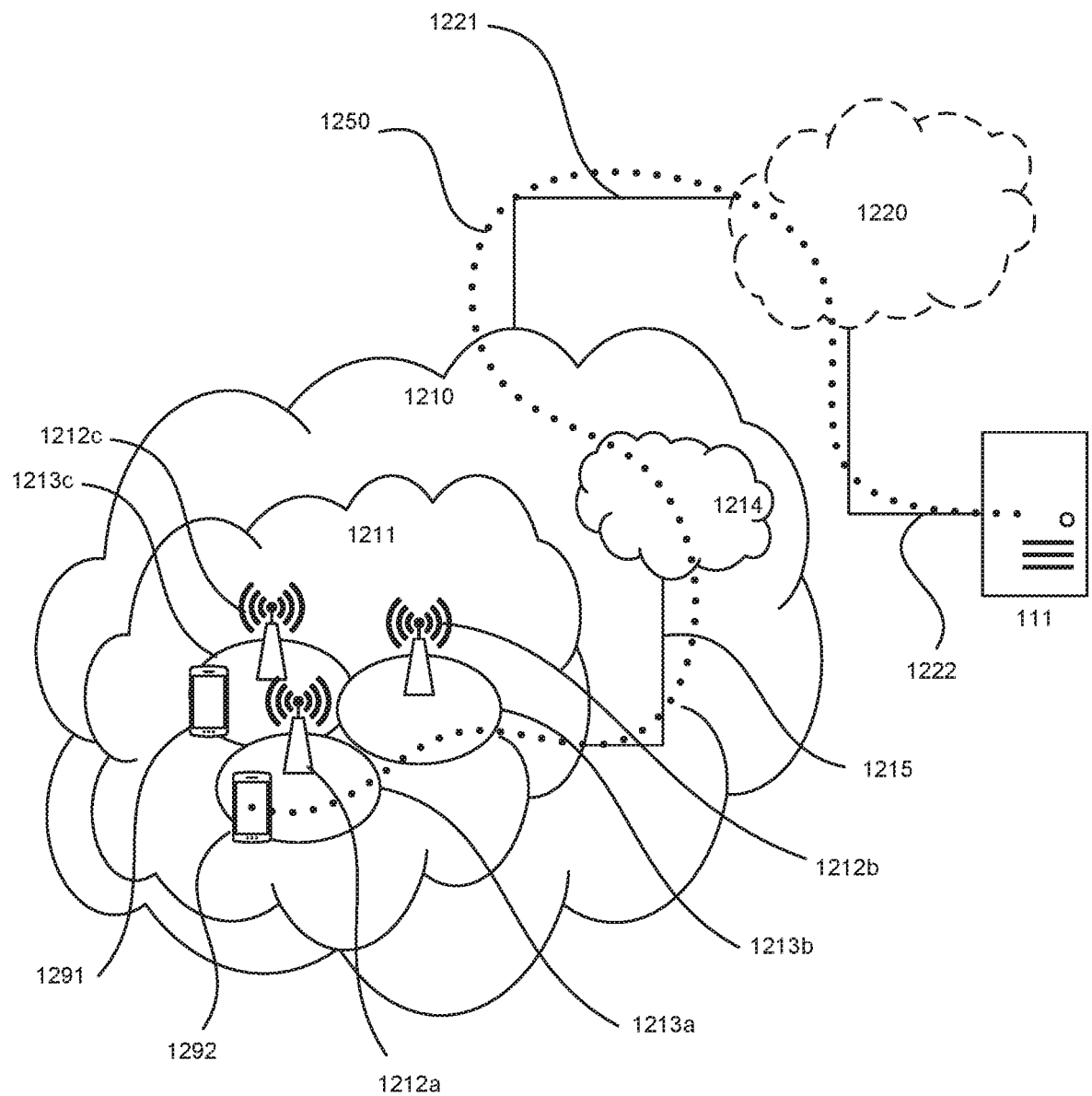
FIG. 8 schematically illustrates a telecommunication network connected via an intermediate network to a host computer.

FIG. 8 illustrates a telecommunication network connected via an intermediate network to host computer 111 in accordance with some embodiments. With reference to FIG. 8, in accordance with an embodiment, a communication system includes telecommunication network 1210, such as a 3GPP-type cellular network, which comprises access network 1211, such as a radio access network, and core network 1214. Access network 1211 comprises a plurality of APs (hereafter base stations) 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 111, which may be embodied in the hardware and/or software of a standalone server, a cloud-implemented server, a distributed server or as processing resources in a server farm. Host computer 111 may be under the ownership or control of a service provider, or may be operated by the service provider or on behalf of the service provider. Connections 1221 and 1222 between telecommunication network 1210 and host computer 111 may extend directly from core network 1214 to host computer 111 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 8 as a whole enables connectivity between the connected UEs 1291, 1292 and host computer 111. The connectivity may be described as an over-the-top (OTT) connection 1250. Host computer 111 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 111 to be forwarded (e.g., handed over) to a connected UE 1291. Similarly, base station 1212 need not be aware of the future routing of an outgoing uplink communication originating from the UE 1291 towards the host computer 111.

Example implementations, in accordance with an embodiment, of the UE, base station and host computer discussed in the preceding paragraphs will now be described with reference to FIG. 9, which illustrates a host computer communicating via a base station with a user equipment over a partially wireless connection in accordance with some embodiments. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 9) served by base station 1320. Communication interface 1326 may be configured to facilitate connection 1360 to host computer 1310. Connection 1360 may be direct or it may pass through a core network (not shown in FIG. 9) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 9:
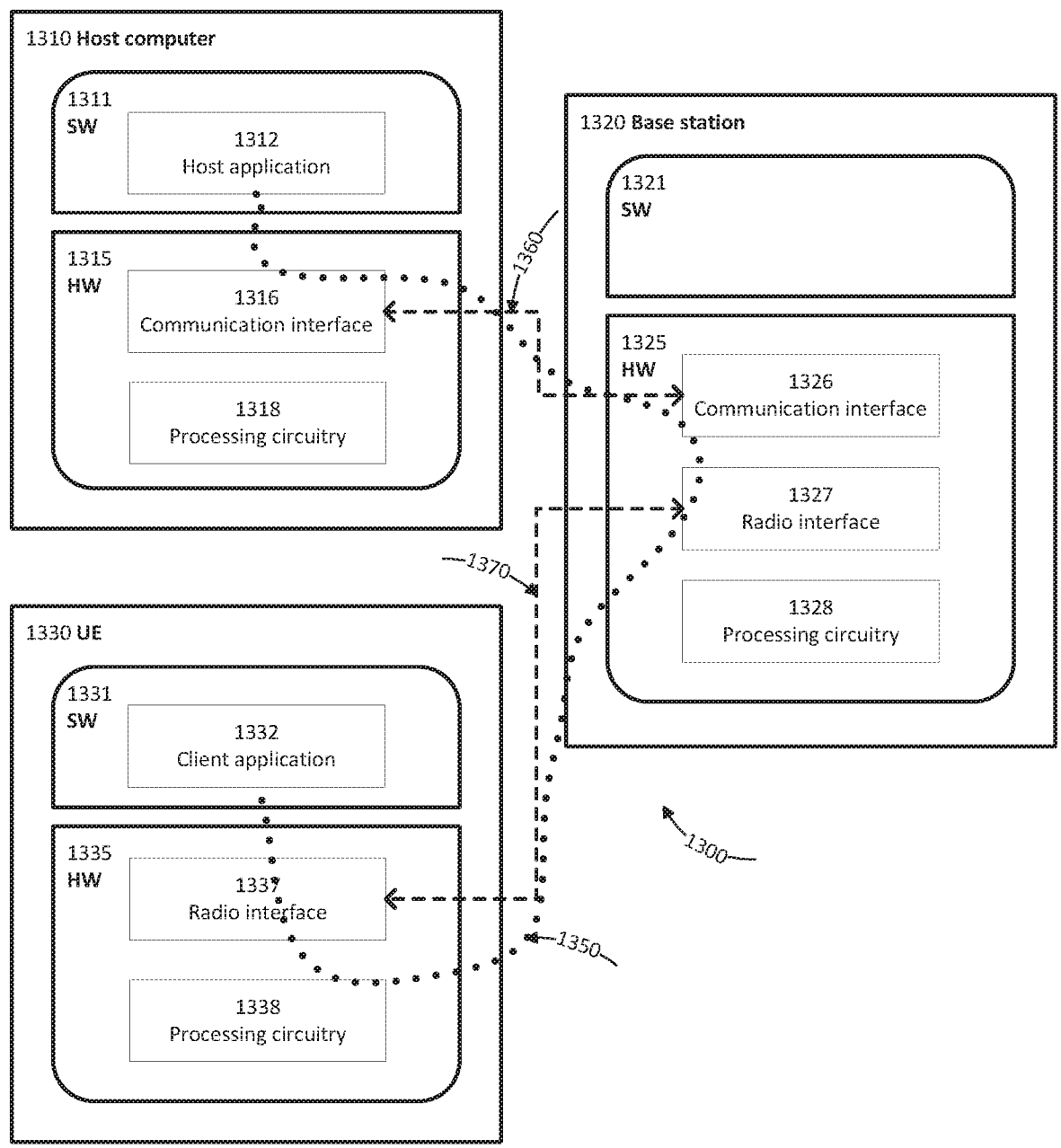
FIG. 9 is a generalized block diagram of a host computer communicating via a base station with a user equipment over a partially wireless connection.

It is noted that host computer 1310, base station 1320 and UE 1330 illustrated in FIG. 9 may be similar or identical to host computer 111, one of base stations 1212a, 1212b, 1212c and one of UEs 1291, 1292 of FIG. 8, respectively. This is to say, the inner workings of these entities may be as shown in FIG. 9 and independently, the surrounding network topology may be that of FIG. 8.

In FIG. 9, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve one or more of message network throughput, SINR, latency, overhead, energy efficiency, network reliability, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 10:
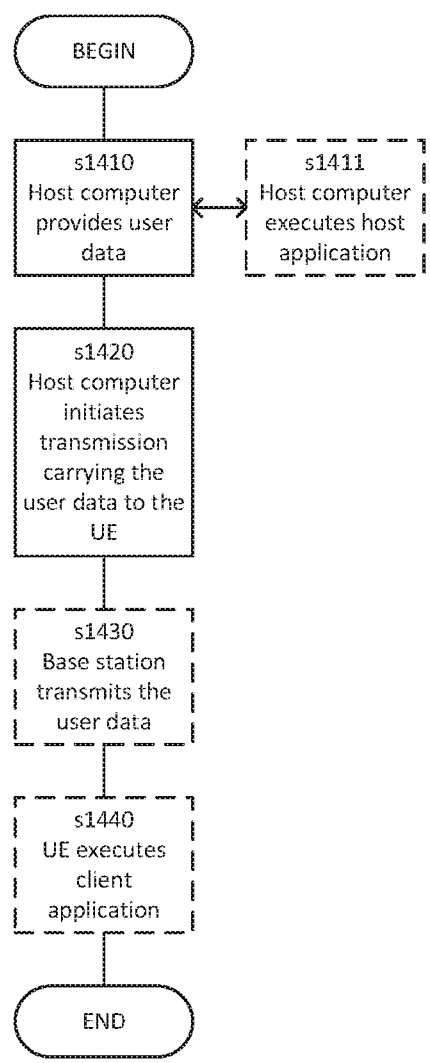
FIG. 10 is a flowchart illustrating a method implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIG. 8 and FIG. 9. In step S1410, the host computer provides user data. In substep S1411 (which may be optional) of step S1410, the host computer provides the user data by executing a host application. In step S1420, the host computer initiates a transmission carrying the user data to the UE. In step S1430 (which may be optional), the base station transmits to the UE the user data which was carried in the transmission that the host computer initiated, in accordance with the teachings of the embodiments described throughout this disclosure. In step S1440 (which may also be optional), the UE executes a client application associated with the host application executed by the host computer.

Figure 11:
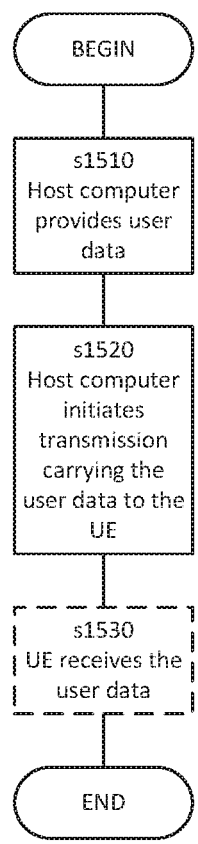
FIG. 11 is a flowchart illustrating a method implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 11 will be included in this section. In step S1510 of the method, the host computer provides user data. In an optional substep (not shown) the host computer provides the user data by executing a host application. In step S1520, the host computer initiates a transmission carrying the user data to the UE. The transmission may pass via the base station, in accordance with the teachings of the embodiments described throughout this disclosure. In step S1530 (which may be optional), the UE receives the user data carried in the transmission.

Figure 12:
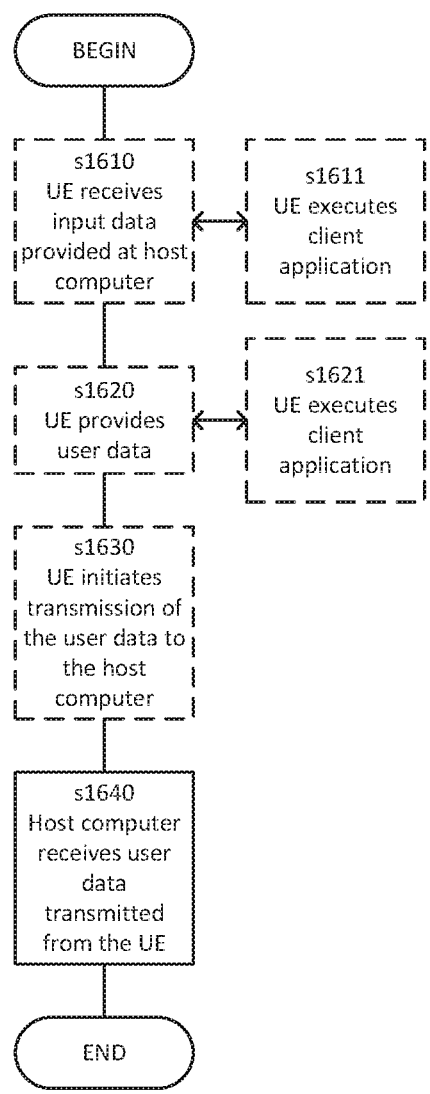
FIG. 12 is a flowchart illustrating a method implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 12 will be included in this section. In step S1610 (which may be optional), the UE receives input data provided by the host computer. Additionally or alternatively, in step S1620, the UE provides user data. In substep S1621 (which may be optional) of step S1620, the UE provides the user data by executing a client application. In substep S1611 (which may be optional) of step S1610, the UE executes a client application which provides the user data in reaction to the received input data provided by the host computer. In providing the user data, the executed client application may further consider user input received from the user. Regardless of the specific manner in which the user data was provided, the UE initiates, in substep S1630 (which may be optional), transmission of the user data to the host computer. In step S1640 of the method, the host computer receives the user data transmitted from the UE, in accordance with the teachings of the embodiments described throughout this disclosure.

Figure 13:
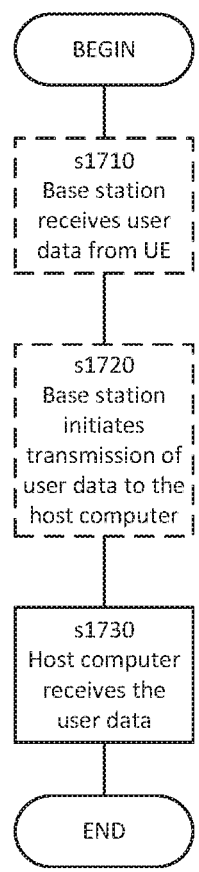
FIG. 13 is a flowchart illustrating a method implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 13 will be included in this section. In step S1710 (which may be optional), in accordance with the teachings of the embodiments described throughout this disclosure, the base station receives user data from the UE. In step S1720 (which may be optional), the base station initiates transmission of the received user data to the host computer. In step S1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for receiving messages transmitted by a first user equipment (UE), the method being performed by a network node (NN) and comprising:
 receiving, during a first time slot, a first signal comprising a first message, $X_1(t)$, transmitted by the first UE;
 receiving, during a second time slot that is subsequent to the first time slot, a combined signal that comprises: i) a second signal transmitted by a relay node (RN) the second signal comprising the first message $X_1(t)$ transmitted by the first UE during the first time slot and a second message $X_2(t)$ transmitted by a second UE during the first time slot and ii) a third signal transmitted by the first UE during the second time slot, wherein the third signal comprises a third message $X_1(t+1)$;
 decoding the first message;
 after decoding the first message, producing a modified combined signal, wherein producing the modified combined signal comprises removing the decoded first message from the combined signal; and
 after producing the modified combined signal, using the modified combined signal to decode the third message $X_1(t+1)$ or the second message $X_2(t)$.

2. The method of claim 1, wherein decoding the first message comprises using the received first signal and the received combined signal to decode the first message.

3. The method of claim 2, wherein decoding the first message using the received first signal and the received combined signal comprises decoding the first message using i) maximum ratio combining, MRC, ii) the received first signal and iii) the received combined signal to decode the first message.

4. The method of claim 1, wherein
 the first signal is a combined signal that comprises not only the first message $X_1(t)$ but also the second message $X_2(t)$, and
 the method further comprises using MRC, the first signal, and the received combined signal to decode the second message $X_2(t)$.

5. The method of claim 4, further comprising:
 after decoding the second message $X_2(t)$, producing a further modified combined signal, wherein producing the further modified combined signal comprises removing the decoded second message $X_2(t)$ from the modified combined signal; and
 after producing the further modified combined signal, using the further modified combined signal to decode the third message $X_1(t+1)$.

6. The method of claim 1, wherein
 the third message $X_1(t+1)$ is decoded after producing the modified combined signal, and
 the method further comprises:
 after decoding the third message, producing a further modified combined signal, wherein producing the further modified combined signal comprises removing the decoded third message $X_1(t+1)$ from the modified combined signal; and
 after producing the further modified combined signal, using the further modified combined signal to decode the second message $X_2(t)$.

7. The method of claim 1, wherein the third message $X_1(t+1)$ is decoded prior to decoding the first message $X_1(t)$.

8. The method of claim 1, further comprising:
 the NN estimating a first channel gain for a channel between the NN and the first UE;
 the NN estimating a second channel gain for a channel between the NN and the RN; and
 the NN providing to the RN information indicating the estimated first channel gain and the estimated second channel gain.

9. A network node (NN) for receiving messages, the NN comprising:
 a receiver; and
 processing circuitry coupled to the receiver, wherein the NN is adapted to:
 receive, during a first time slot, a first signal comprising a first message, $X_1(t)$, transmitted by a first user equipment (UE);
 receive, during a second time slot that is subsequent to the first time slot, a combined signal that comprises: i) a second signal transmitted by a relay node, RN, the second signal comprising the first message $X_1(t)$ transmitted by the first UE during the first time slot and a second message $X_2(t)$ transmitted by a second UE during the first time slot and ii) a third signal transmitted by the first UE during the second time slot, wherein the third signal comprises a third message $X_1(t+1)$;
 decode the first message;
 after decoding the first message, produce a modified combined signal, wherein producing the modified combined signal comprises removing the decoded first message from the combined signal; and
 after producing the modified combined signal, use the modified combined signal to decode the third message $X_1(t+1)$ or the second message $X_2(t)$.

10. The NN of claim 9, wherein the NN is configured to:
 estimate a first channel gain for a channel between the NN and the first UE;
 estimate a second channel gain for a channel between the NN and the RN; and
 provide to the RN information indicating the estimated first channel gain and the estimated second channel gain.

11. The NN of claim 9, wherein decoding the first message comprises using the received first signal and the received combined signal to decode the first message.

12. The NN of claim 11, wherein decoding the first message using the received first signal and the received combined signal comprises decoding the first message using i) maximum ratio combining, MRC, ii) the received first signal and iii) the received combined signal to decode the first message.

13. The NN of claim 9, wherein
 the first signal is a combined signal that comprises not only the first message $X_1(t)$ but also the second message $X_2(t)$, and
 the NN is adapted to use MRC, the first signal, and the received combined signal to decode the second message $X_2(t)$.

14. The NN of claim 13, wherein the NN is adapted to:
 after decoding the second message $X_2(t)$, produce a further modified combined signal, wherein producing the further modified combined signal comprises removing the decoded second message $X_2(t)$ from the modified combined signal; and
 after producing the further modified combined signal, use the further modified combined signal to decode the third message $X_1(t+1)$.

15. The NN of claim 9, wherein
 the third message $X_1(t+1)$ is decoded after producing the modified combined signal, and
 the NN is further adapted to:
 after decoding the third message, produce a further modified combined signal, wherein producing the further modified combined signal comprises removing the decoded third message $X_1(t+1)$ from the modified combined signal; and after producing the further modified combined signal, use the further modified combined signal to decode the second message $X_2(t)$.

16. A computer program product comprising a non-transitory computer readable medium storing instructions for performing the method of claim 1.

* * * * *